Feb. 18, 1964 L. W. LESSLER 3,121,367
PANORAMIC MOTION PICTURE CAMERA
Filed Dec. 21, 1961 4 Sheets-Sheet 1

INVENTOR.
LEW W. LESSLER

BY James & Franklin
ATTORNEYS

Feb. 18, 1964 L. W. LESSLER 3,121,367
PANORAMIC MOTION PICTURE CAMERA
Filed Dec. 21, 1961 4 Sheets-Sheet 2

INVENTOR.
LEW W. LESSLER
BY
ATTORNEYS

Feb. 18, 1964 L. W. LESSLER 3,121,367
PANORAMIC MOTION PICTURE CAMERA
Filed Dec. 21, 1961 4 Sheets-Sheet 3

INVENTOR.
LEW W. LESSLER
BY
ATTORNEYS

Feb. 18, 1964 L. W. LESSLER 3,121,367
PANORAMIC MOTION PICTURE CAMERA
Filed Dec. 21, 1961 4 Sheets-Sheet 4
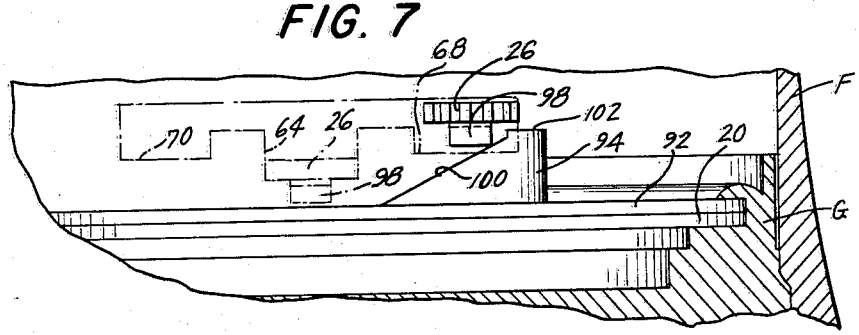
FIG. 7
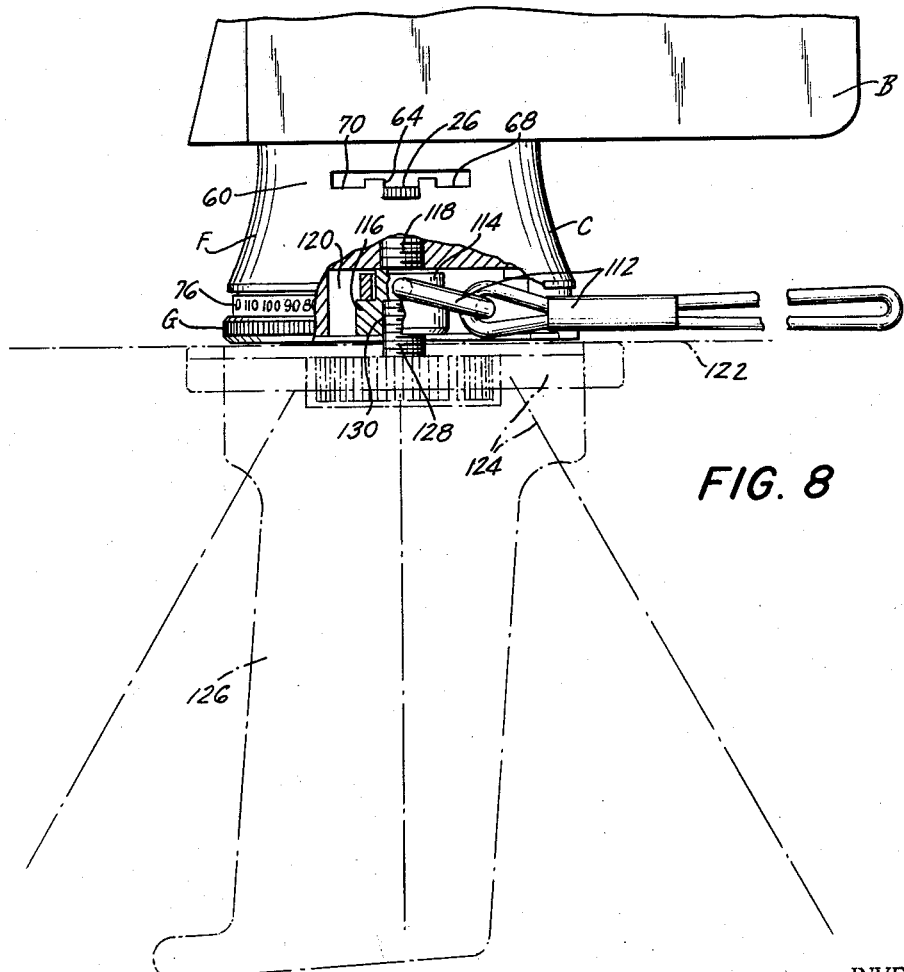
FIG. 8
FIG. 9
INVENTOR.
LEW W. LESSLER
BY James K. Franklin
ATTORNEYS

United States Patent Office 3,121,367
Patented Feb. 18, 1964

3,121,367
PANORAMIC MOTION PICTURE CAMERA
Lew W. Lessler, Elmhurst, N.Y., assignor to DeJur-Amsco Corporation, Long Island City, N.Y., a corporation of New York
Filed Dec. 21, 1961, Ser. No. 161,216
3 Claims. (Cl. 88—16)

This invention relates to a panoramic motion picture camera.

In panoramic motion picture cameras of known designs, the camera is mounted for panoramic rotation on a base adapted to be mounted on a support such as a tripod. The base is customarily provided with an annular or ring gear, and the camera is provided with means including a gear or pinion, which latter is adapted to be manually moved into and out of mesh with the ring gear. The camera motor that operates the film drives and other movable camera mechanism is gear connected to the pinion, whereby when the camera drives are operated and the pinion is manually moved into mesh with the ring gear, the camera will be rotated on the base to take a panoramic scene.

The prime object of my present invention is directed to the provision of a panoramic motion picture camera characterized by the following main structural and operational features:

(1) All of the added drive mechanism required for panoramic operation is contained and housed within the customary handgrip or stand of the motion picture camera; thereby panoramic action is added to the other functions of the camera, without adding to camera bulk or volume, and thus maintaining camera compactness, the added mechanism being moreover fully and protectively enclosed by the housing provided by the handgrip.

(2) The panoramic drive mechanism is designed, by means of the simple manual manipulation of a control lever extending from the handgrip housing, to permit a wide flexibility of use of the camera including the performing of the following: (a) the normal use of the camera, the panoramic drive mechanism being then locked in neutral position, (b) the selective panoramic rotation of the camera in either a right hand or left hand direction, (c) the selection by a predetermined setting of the degree of angular travel or rotation of the camera up to 120 degrees and in either direction; and (d) the automatic stopping of the camera rotation at the end of its predetermined travel and the automatic return of the panoramic drive mechanism to its neutral and locked position.

For the accomplishment of the said objects and such other objects as will appear hereinafter, the present invention relates to improvements in a panoramic motion picture camera as particularly defined in the appended claims taken together with the following description of the invention and the accompanying drawings, in which:

FIG. 7 is a fragmentary elevational view taken in the direction of the line 7—7 of FIG. 6 drawn to an enlarged scale with reference to that of FIG. 6;

FIG. 8 is an elevational view with parts broken away and other parts shown in section of the handgrip part of the camera and depicting the different ways in which the camera may be supported for a panoramic operation; and FIG. 9 is a development view of the scale employed with the camera.

Figure 1:
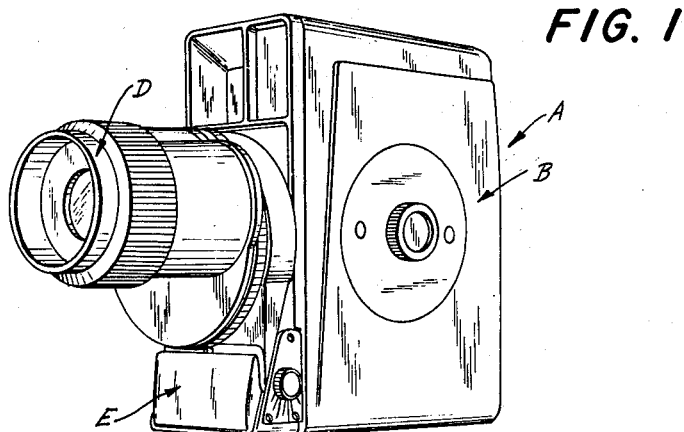
FIG. 1 is a perspective view of the panoramic motion picture camera.

Referring now somewhat in detail to the drawings, and having reference first to FIG. 1 thereof, the panoramic motion picture camera generally designated as A is of the type in which the mechanism of the camera for driving the motion picture film and the other moving parts of the camera are contained in a camera casing B supported by a handhold or handgrip generally designated as C, the camera as illustrated being of the type embodying a zoom lens D and an automatic exposure means indicated by the normally closed selenium cell closure element E.

Figure 2:
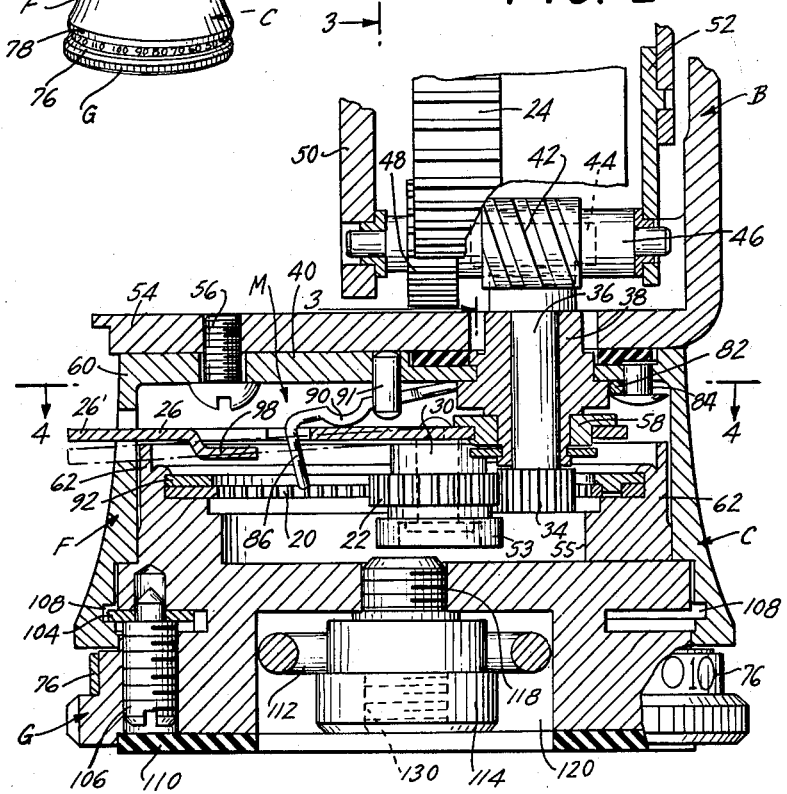
FIG. 2 is a view largely in longitudinal cross-section and drawn to an enlarged scale of the handgrip section of the camera, showing the panoramic drive mechanism therein and its connection to the motor of the camera.
Figure 3:
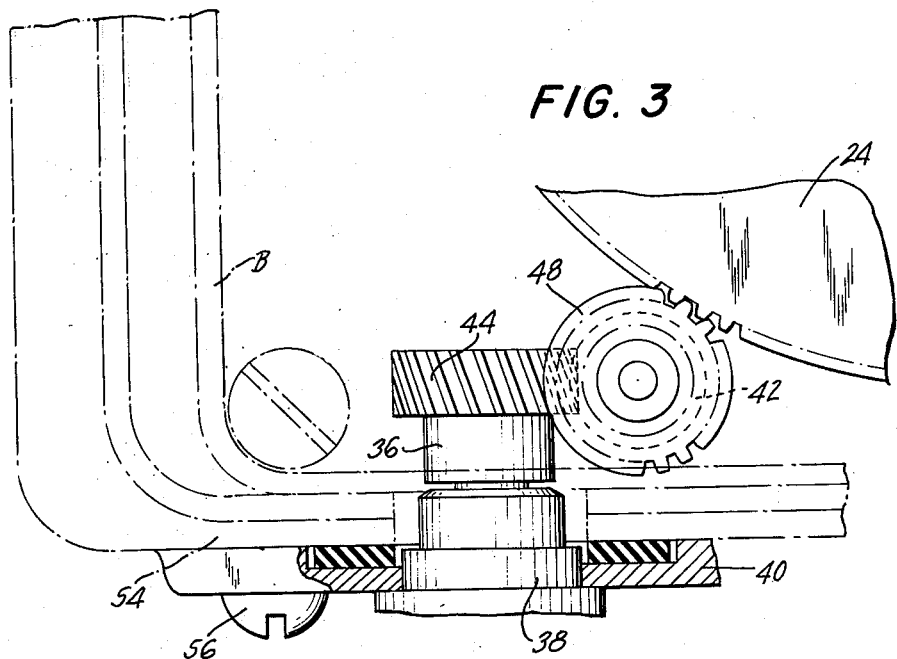
FIG. 3 is a fragmentary view of FIG. 2 drawn to a further enlarged scale and taken in cross-section along the broken lines 3—3 of FIG. 2.

Referring now to FIG. 2 of the drawings, the handgrip or handhold C in the camera of the present invention is made to comprise a housing support F attached to the bottom of the camera casing B and a base G on which the housing support F (and its attached camera casing) is rotatably mounted for panoramic motion. The upper part of the base G projects into and is enclosed by the housing support F as is clearly depicted in FIG. 2 of the drawings.

All of the added drive mechanism, generally designated as M, required for panoramic operation is contained and housed within the housing support F of the handgrip C. The essential parts of this mechanism comprise an annular or ring gear 20 affixed to the base G and means for detachably connecting the motor drive of the camera to said ring gear comprising an intermediate or idler gear 22 mounted on the housing support F and connected in a manner to be presently described to the camera contained spring drum gear 24, the said idler gear being adapted to be selectively movable between a neutral disconnected position and a position into meshing relation with said ring gear 20, effective in the latter position to rotate the camera casing B and the housing support F with reference to the base G.

The idler gear 22 is carried by a control member in the form of a lever 26 swivelly or pivotally mounted on the housing support F in a manner to be presently described, the said control lever having its terminus 26' extending to the exterior of the housing support F for manual manipulation to selectively move said idler gear 22 into and out of mesh with the ring gear 20.

Figure 4:
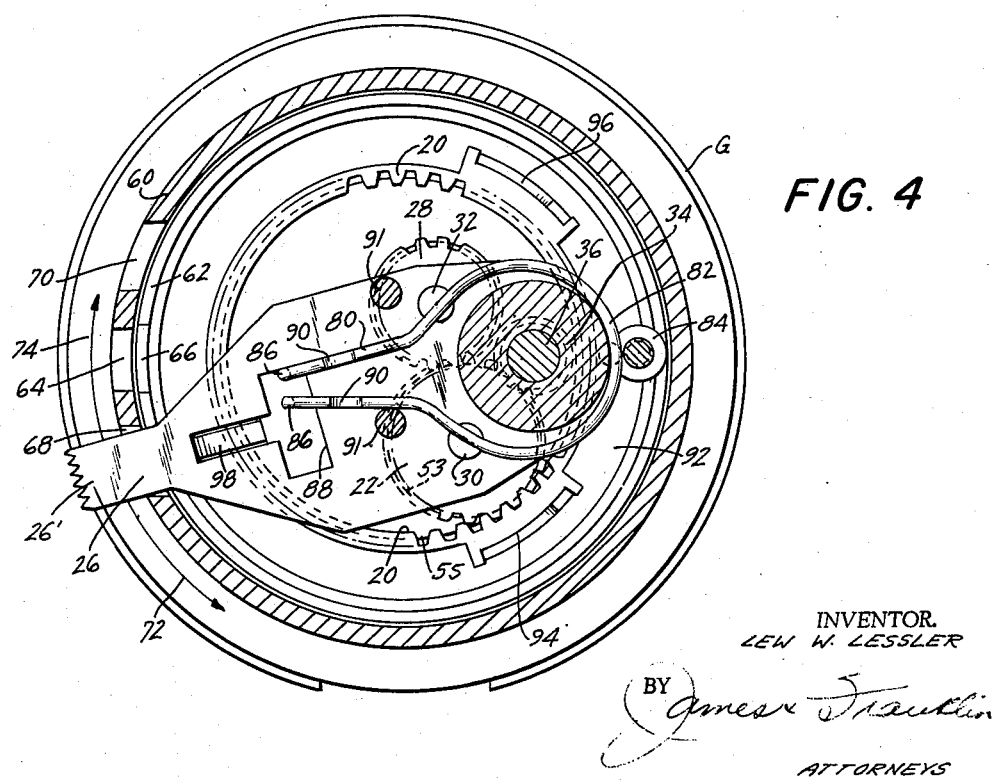
FIG. 4 is a plan view of FIG. 2 taken in cross-section in the plane of the line 4—4 of FIG. 2 and showing the panoramic drive mechanism in a position at the beginning of the rotation of the camera in one direction.
Figure 5:
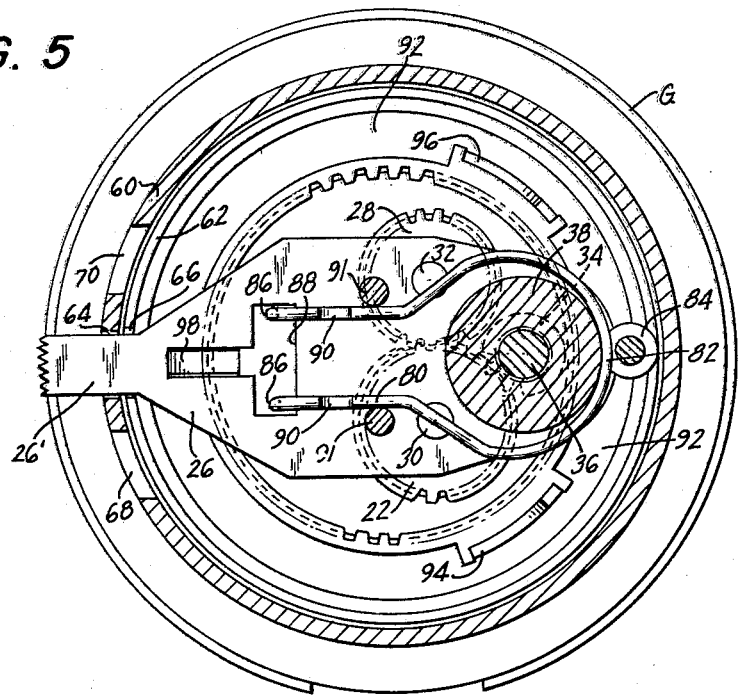
FIG. 5 is a view similar to FIG. 4 and showing the panoramic drive mechanism in a neutral position.
Figure 6:
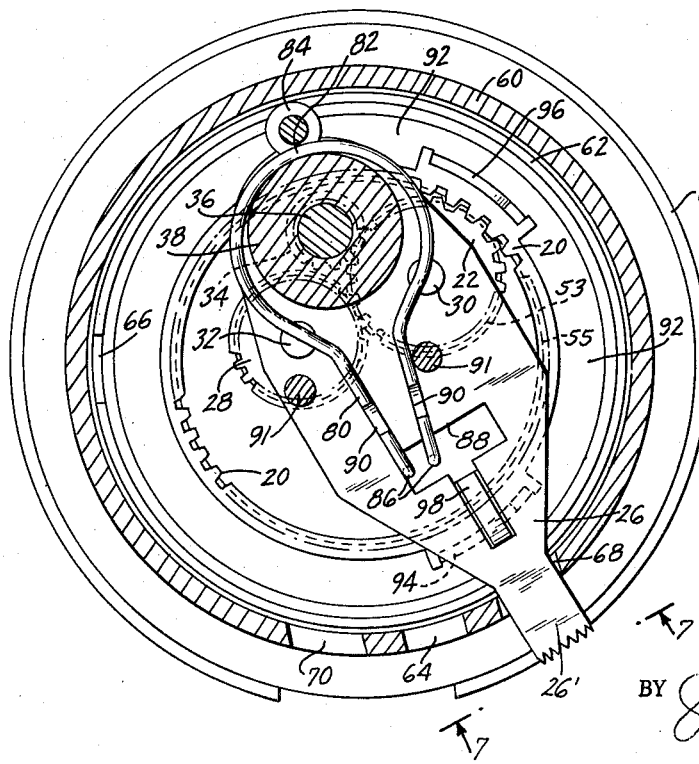
FIG. 6 is a view simliar to FIG. 4 but showing the panoramic drive mechanism in a position approaching the end of its rotational travel in the aforesaid direction.

In the preferred form of the invention, as shown in FIGS. 4 to 6 of the drawings, two intermediate or idler gears 22 and 28 are employed to provide for selective panoramic rotation of the camera either in a right hand or in a left hand direction, these idler gears being rotatably supported on studs 30 and 32 fixedly carried by the control lever 26 and being arranged in meshing relation, the idler gear 22 in turn meshing with a pinion 34 (see FIG. 2). The pinion 34 is fixed to a shaft 36 journalled in a sleeve 38 in turn joined to the upper wall 40 of the support housing F, the upper end of the shaft 36 being provided with a worm gear 44 which meshes with a worm 42 on a shaft 46, the latter carrying a pinion 48 which meshes with and is driven by the spring drum gear 24. The shaft 46 is suitably journalled in plates 50 and 52 located in the camera casing B. To stabilize the meshing of the idler gear 22 with the ring gear 20, the former is provided with a circular boss 53 at its bottom which during gear meshing rides on surface 55 formed in a cavity of the base G (see FIGS. 2, 4 and 6). Idler gear 28 is similarly provisioned. The support housing F is secured to the camera casing B in any desired manner as by attaching the top wall 40 of the support housing to the bottwall 54 of the camera casing by means of spaced screws 56 (one of which is shown in FIG. 2 of the drawings).

The control lever 26 is as heretofore stated swivelly mounted on the casing support F; and this may conveniently be accomplished by the attachment of the inner end of the lever to a grommet 58 pivotally mounted on the sleeve 38.

It will be noted that all of the panoramic driving mechanism, including the driven ring gear attached to the base and the driving gears mounted on the support housing, are contained and housed within the housing F and thus within the customary handgrip of the motion picture camera; and thereby panoramic action is added to the other functions of the camera depicted in FIG. 1 of the drawings, without adding to the camera bulk or volume, thus maintaining camera compactness, the added mechanism being moreover fully and protectively enclosed by the handgrip housing support. It will be further noted, as shown particularly in FIGS. 1 and 2 of the drawings, that only the outer end of the control lever extends to the exterior of the handgrip, this for manual manipulation of the control lever.

As heretofore noted, the panoramic drive mechanism is designed, by means of the simple manual manipulation of the said control lever, to permit a wide flexibility of use of the camera including the performing of the following:

(a) The normal use of the camera, the panoramic drive mechanism being then locked in neutral position, (b) The selective panoramic rotation of the camera in either a right hand or left hand direction, (c) The selection by a predetermined setting of the degree or angular travel or rotation of the camera up to 120 degrees and this in either direction of the rotation; and (d) The automatic stopping of the camera rotation at the end of its predetermined travel and the automatic return of the panoramic drive mechanism to its neutral and locked position.

It is the essence of the structure of the present invention that all of these functions with the flexibility indicated may be accomplished by the relatively simple mechanical arrangement of the parts thus far described and by simple and convenient manipulation of the extended end of the control lever.

To lock the panoramic drive mechanism in a neutral position, namely, the position of the control lever 26 and the idler gears 22 and 28 carried thereby shown in FIG. 5 of the drawings, the outer wall 60 of the housing support F and the adjacent wall 62 of the base G are provided respectively with notched portions 64 and 66, which when in registration receive the end part 26' of the lever 26, this part then functioning to lock together the base G and the housing support F. To unlock the same for any of the purposes hereinafter described, the control lever 26 is lifted out of the notched portions from the dotted to the full line position shown in FIG. 2.

To effect the selective panoramic rotation of the camera in either a right hand or a left hand direction, the outer wall 60 of the housing support F is provided with two other notched portions 68 and 70 on opposite sides of the notched portion 64. When the lever 26, lifted from the neutral notched portion 64, is moved to the position shown in FIG. 4 of the drawings into the notched portion 68, the idler 22 is caused to mesh with the ring gear 20 (as shown in FIG. 4 of the drawings), whereby upon operation of the camera motor the camera (casing B and its attached housing support F) will rotate with reference to the base G in the direction indicated by the arrow 72 in FIG. 4. When, however, the lever 26 lifted from the neutral notched portion 64 is moved in the opposite direction to the position for being engaged by the notched portion 70, then the idler gear 28 is moved to mesh with the ring gear 20 whereby upon operation of the camera motor, the camera (casing and its attached housing support) will rotate with reference to the base G in the opposite direction indicated by the arrow 74. Thus the operator may select either the right hand or left hand direction of panoramic rotation of the camera. The structure provided also enables the operator to select a predetermined setting of the degree of angular travel or rotation of the camera, and in either rotational direction. To enable the indexing of such a predetermined setting the base G is provided with a scale plate 76 shown in a developed view in FIG. 9 of the drawings, said scale plate having indicia in increments of degrees of 10 from 120 down to 0 in both directions from a central position, thus showing the user the amount of travel remaining before the zero position is reached. With this scale cooperates a pointer in the form of a dot 78 provided at the bottom of the housing support F. Normally when the lever 26 is set for travel in one of the side notches 68 or 70, without disturbing the base G, the total travel of 120 degrees will be achieved. However, if less travel is required, the lever 26 may be held out of engagement (upward) and the base G may then be turned by hand so that the indicator dot on the housing F registers with the desired degree mark on the scale 76, whereupon said lever is placed in the side notch in the normal manner, thereafter permitting the unit to travel the indicated reduced number of degrees.

The automatic stopping of the camera rotation at the end of its predetermined travel and the automatic return of the panoramic drive mechanism to its neutral and locked position is provided by the mechanism now to be described. Means is provided for biasing the control member 26 to move it and the idler gears carried thereby to the neutral position shown in FIG. 5 of the drawings. This is accomplished by a hairpin spring 80 anchored at its central bight portion 82 to a rivet 84, the arms of the hairpin spring being formed with down-turned fingers 86, 86 projecting through an orifice 88 in the lever 26 and also provided with curved portions 90 adapted to engage the top of the lever 26. With this construction it will be observed that the lever 26 is biased downwardly by the engagement of the curved portions 90, 90 and is biased toward its neutral position by the fingers 86, 86, either one or the other of the spring arms being under tension when the lever is engaged in either of the outside notches 68 and 70, as will be clear upon inspection of FIGS. 4 and 6 of the drawings. Fixed pins 91, 91 provide anchoring means for tensioning the spring 80 in its active (non-neutral) positions.

Associated with this biasing of the control lever, there is provided means for tripping the control member to return the idler gears to neutral position, when the camera reaches the end of its predetermined and selected travel. This is accomplished by providing the cam plate 92 surrounding the ring gear 20 (both being secured to the base G in the manner best shown in FIGS. 2 and 7 of the drawings), the said cam plate being provided with two cam sections 94 and 96 spaced so that in the position shown in FIG. 4 of the drawings the lever will have a movement (in either selected direction) of 120 degrees. To cooperate with these cam sections the lever 26 is formed with a down-struck finger 98, the cam sections being arranged to lie in the path of movement of the said finger. The operation of these parts is best illustrated in FIGS. 6 and 7 of the drawings. As the lever 26 moves to the end of its selected travel, the finger 98 is engaged by the rise 100 of the cam section 94, lifting the lever arm 26 out of the notch 68, permitting the spring 80 (see FIG. 6) to then effect the return of the lever 26 to the neutral position (FIG. 5), whereupon the lever end 26' will be biased downwardly into the registering locking notches 64 and 66. A similar action takes place when the parts are moving in the opposite rotative direction, the lever finger 98 being then engaged by the cam section 96. Each cam section is provided with an elevated part 102 above its rise to form a positive stop for the motion of the parts.

The parts mounted on the base G as well as all of the parts mounted on and within the housing support F, are supported for easy sub-assembly and access to their units for adjustment, servicing, etc. The base G is attached to the housing sub-assembly F uniquely by a screw and floating washer arrangement. Washers 104 (three being provided, one being shown in FIG. 2) are urged by the pointed ends of screws 106 into the inside annular groove 108 in the housing F wherein said washers simultaneously serve as retaining and sliding guide members. The screws 106 are concealed by the cushion pad 110 to improve appearance and discourage tampering.

The camera support or handgrip C, comprising both the housing F and the base G, is preferably provided with the customary wrist strap 112 attached to a ring 114 in turn held by a coupling stud 116 screw threadedly received as at 118 in a wall of the recess 120 in the bottom of the base G. In FIG. 8 is shown different ways of supporting the camera for a panoramic or a non-panoramic operation. The housing F is grasped as a handgrip, with the wrist strap 112 for additional support when holding the camera in normal use without the panoramic device operating. The handgrip is so arranged, as shown in FIG. 8, that it may be placed within the base whereby the base may be readily placed on the surface 122 of a table top or on the top of a tripod 124 or the top of a pistol type of handgrip 126, for automatic panoramic operation. Engagement with the tripod or pistol grip screw 128 is provided by a threaded socket 130 in the stud 116.

When the lever 26, spring biased to its neutral position, is lifted from the neutral notched portion 64, and is moved to the position shown in FIG. 4 of the drawings into the notched portion 68, the idler 22 is caused to mesh with the ring gear 20 (as shown in FIG. 4 of the drawings), whereby upon operation of the camera motor the camera (casing B and its attached housing support F) will rotate with reference to the base G in the direction indicated by the arrow 72 in FIG. 4. When, however, the lever 26 lifted from the neutral notched portion 64 is moved in the opposite direction to the position for being engaged by the notched portion 70, then the idler gear 28 is moved to mesh with the ring gear 20 whereby upon operation of the camera motor, the camera (casing and its attached housing support) will rotate with reference to the base G in the opposite direction indicated by the arrow 74. Thus the operator may select either the right hand or left hand direction of panoramic rotation of the camera. Normally when the lever 26 is set for travel in one of the side notches 68 or 70, without disturbing the base G, the total camera travel of 120 degrees will be achieved. As the lever 26 moves to the end of its selected travel, the finger 98 is engaged by the rise 100 of the cam section 94, lifting the lever arm 26 out of the notch 68, permitting the spring 80 (see FIG. 6) to then effect the return of the lever 26 to the neutral position (FIG. 5), whereupon the lever end 26' will be biased downwardly into the registering locking notches 64 and 66. A similar action takes place when the parts are moving in the opposite rotative direction, the lever finger 98 being then engaged by the cam section 96. Each cam section is provided with an elevated part 102 above its rise to form a positive stop for the motion of the parts.

It will be further apparent that many changes may be made in the structure and in the relative arrangement of the parts without departing from the spirit of the invention as defined in the following claims.

I claim:

1. A panoramic motion picture camera comprising a camera casing for the mechanism of the camera, a housing support attached to the camera casing bottom, and a base for said housing support, said camera casing and support housing being rotatably mounted on said base for panoramic motion, a motor in the camera casing, a ring gear affixed to said base and located within the housing support, means for selectively connecting and disconnecting said motor with said gear comprising gearing mounted on and within said housing support including an idler gear located within the ring gear selectively movable between a neutral position and a position into meshing relation with said ring gear effective in the latter position to rotate the camera casing and housing support, a control member connected to said idler gear and extending to the exterior of the housing support for manual manipulation to selectively move said idler gear, means for biasing the control member to move the idler gear to its neutral position, means for locking the control member with the idler gear in meshing position, and means in the path of movement of the control member during rotation of the housing support on the base for tripping the control member to return the idler gear to its neutral position.

2. The panoramic motion picture camera of claim 1, with means for locking the control member to lock the idler gear in its neutral position.

3. A panoramic motion picture camera comprising a camera casing for the mechanism of the camera, a housing support attached to the camera casing bottom, and a base for said housing support, said camera casing and housing support being rotatably mounted on said base for panoramic motion, a motor in the camera casing, a ring gear affixed to said base and located within the housing support, and means for selectively connecting said motor with said ring gear comprising gearing mounted on and within said housing support including a pair of idler gears located within said ring gear selectively movable between a neutral position and alternative positions into meshing relative with said ring gear to rotate the camera casing and housing support either in one or the reverse rotative direction, a control member carrying said idler gears and extending to the exterior of the housing support for manual manipulation for selectively moving said idler gears, means for locking the idler gears selectively in their neutral and meshing positions comprising three spaced notched portions in the wall of said housing support selectively engaged by said control member, means for biasing the idler gears to the neutral position comprising a spring active on said control member, and means in the path of movement of the control member during rotation of the housing support in either of its opposite rotative directions for tripping the control member to return the same and the idler gears from either one or the other of its locked positions to the neutral position.

References Cited in the file of this patent

FOREIGN PATENTS 249,117    Great Britain _____ Aug. 26, 1926